United States Patent [19]

Beelitz

[11] 3,725,801

[45] Apr. 3, 1973

[54] VOLTAGE DRIVER CIRCUIT

[75] Inventor: Howard Raymond Beelitz, Princeton, N.J. 08540

[73] Assignee: RCA Corporation

[22] Filed: Apr. 5, 1971

[21] Appl. No.: 130,963

[52] U.S. Cl. ........................ 330/30 D, 330/17, 330/24

[51] Int. Cl. .................................................. H03f 3/68

[58] Field of Search ........307/235, 238; 330/69, 30 D

[56] References Cited

UNITED STATES PATENTS

| | | | |
|---|---|---|---|
| 3,564,286 | 2/1971 | Rubner et al. | 307/235 |
| 3,519,848 | 7/1970 | Vercellotti | 307/235 |
| 3,538,348 | 11/1970 | Hillis et al. | 307/235 X |

*Primary Examiner*—Nathan Kaufman
*Attorney*—H. Christoffersen

[57] ABSTRACT

A voltage driver circuit which may be utilized as an input circuit to a sense amplifier and which operates as a voltage level shifting circuit to permit interconnection of different types of circuit technology.

8 Claims, 1 Drawing Figure

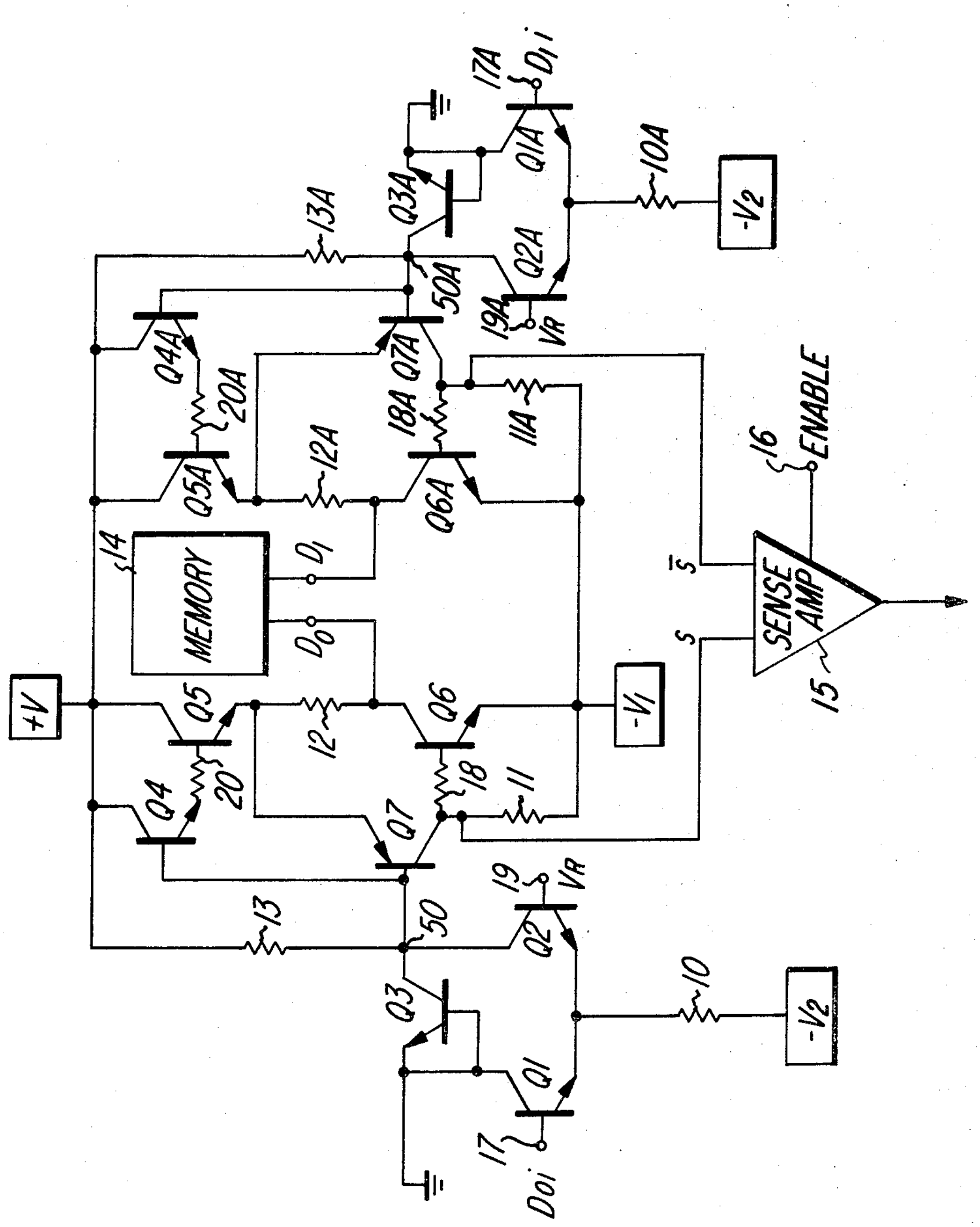
INVENTOR.
Howard R. Beelitz
BY
G. Donald Weber, Jr.
ATTORNEY

VOLTAGE DRIVER CIRCUIT

BACKGROUND AND CROSS REFERENCES

It is frequently desirable to interconnect different types of circuits which have been produced by different technology. For example, many circuits utilize the so-called ECL circuitry to operate upon signals and produce suitable or desired logic functions. In ECL logic circuitry, the signal levels used are relatively small, for example, on the order of −1.6 volts to −0.8 volt from the low to the high level. In other circuit technology such as the MOS technology, the voltage swing in the signals is quite large, for example 0 to 10 volts from the low to the high level. Since ECL logic circuits are utilized to operate upon signals to produce certain logic functions, and since many memories or the like are fabricated using MOS techniques, it is frequently essential or desirable to provide associated circuits which are compatible with the two types of circuit technology.

In the co-pending application entitled "Gated Amplifier" by Howard Raymond Beelitz, bearing Ser. No. 44,237, now U.S. Pat. No. 3,651,421 (3–21–72) filed on June 8, 1970 and assigned to the common assignee, there is described a sense amplifier circuit. This sense amplifier is utilized to operate upon signals from a memory which may be fabricated from MOS circuit techniques and controlled by a suitable ECL logic circuitry. Consequently, associated circuitry, for example, an interfacing circuit, which is compatible to both types of circuit technology is required.

SUMMARY OF THE INVENTION

The invention relates to a combined voltage driver and sense amplifier input circuit. This circuit performs both of the noted functions efficiently with a minimum number of components. A suitable coupling means selectively couples signals from a signal supplying means to an output means as a function of applied input signals. A level shifting means permits the circuit to function as an interface circuit between circuits of different types of technology.

In one embodiment of the invention, a pair of the voltage driver and sense amplifier input circuits are provided. The circuits are arranged symmetrically so as to correspond to a circuit which would be used with semiconductor (MOS) memories. By utilizing a pair of symmetrically arranged circuits, differential operation can be utilized whereby common mode noise suppression is achieved.

BRIEF DESCRIPTION OF THE DRAWING

The single FIGURE is a schematic diagram of a preferred embodiment of the instant invention.

DESCRIPTION OF THE PREFERRED EMBODIMENT

In the attached drawing, there is shown a schematic diagram of an interfacing circuit, for example a combined voltage driver and sense amplifier input circuit. In fact, a pair of such circuits, symmetrically arranged, is provided. Thus, in each of the symmetrical circuits, similar components bear similar reference numerals with the suffix A included in the reference numerals for one of the symmetrical circuits.

The $D_{0I}$ input signal is supplied to terminal 17 which is connected to the base of transistor Q1. Similarly, the $D_{1I}$ input signal is supplied to input terminal 17A which is connected to the base of transistor Q1A. In addition, a reference voltage $V_R$ is connected to terminals 19 and 19A which are connected to the base of transistor Q2 and the base of transistor Q2A, respectively. The emitters of transistors Q1 and Q2 are connected together and to source $-V_2$ via resistor 10. Likewise, the emitters of transistors Q1A and Q2A are connected together and further connected to source $-V_2$ via resistor 10A. The collector of transistor Q1 is connected to the base and emitter electrodes of transistor Q3 as well as to ground. The collector of transistor Q3 is connected to the collector of transistor Q2. LIkewise, diode-connected-transistor Q3A is connected between the collector electrodes of transistors Q2A and Q1A, respectively. The collector of transistor Q1A as well as the base emitter of transistor Q3A is connected to ground.

The collector of transistor Q2 is further connected to source +V via resistor 13, as is the collector of transistor Q2A via resistor 13A. In addition, the collector of transistor Q2 is connected to the base of transistor Q7 and to the base of transistor Q4. The collector of transistor Q4 is connected to source +V along with the collector of transistor Q5. The emitter of transistor Q4 is connected to the base of transistor Q5 through resistor 20. The emitter of transistor Q5 is connected to the emitter of transistor Q7 and, via resistor 12, to the collector of transistor Q6. In some applications, resistor 12 may be omitted. The emitter of transistor Q6 is connected to source $-V_1$. Resistors 11 and 18 are connected in series between source $-V_1$ and the base of transistor Q6. The common junction of resistors 18 and 11 is connected to the collector of transistor Q7 and to the S input of sense amplifier 15.

In a similar configuration, the collector of transistor Q3A is connected to the bases of transistors Q7A and Q4A. The collectors of transistor Q4A and transistor Q5A are connected to source +V. The emitter of transistor Q4A is connected to the base of transistor Q5A through resistor 20A. The emitter of transistor Q5A is connected to the emitter of transistor Q7A and, via resistor 12A, to the collector of transistor Q6A. Resistor 12A may also be omitted in some cases. The emitter of transistor Q6A is connected to source $-V_1$. The series-connected resistors 18A and 11A are connected between the base of transistor Q6A and source $-V_1$. The common junction of resistors 11A and 18A is connected to the collector of transistor Q7A and to the $\overline{S}$ input of sense amplifier 15. Enable input terminal 16 is also connected to sense amplifier 15. The enable input signal is supplied by circuitry external to the instant circuit and is not shown.

In addition, the $D_0$ terminal of memory 14 is connected to the collector of transistor Q6. The $D_1$ terminal of memory 14 is connected to the collector of transistor Q6A. Terminals $D_0$ and $D_1$ may be connected to drive-sense lines associated with individual memory cells or the like in memory 14. Memory 14 does not form a portion of the invention, per se, and may be any suitable memory device or system. Typical memory systems which can be used with this circuit are shown and described in U.S. Pat. No. 3,521,242, by Katz and entitled "Complementary Transistor Write and NDRO for Memory Cell" or U.S. Pat. No. 3,275,996, by Burns and entitled "Driver-sense Circuit Arrangement." These memory systems are illustrative only and are not meant to be limitative of the invention.

In operation, the input signals are supplied to terminals 17 and 17A, respectively. As noted supra, it is necessary to describe the operation of only one portion of the symmetrical network inasmuch as the other circuit portion operates similarly. The input signals may be a binary 1 (on the order of −0.8 volt) or a binary 0 (on the order of −1.6 volts). The signals are defined in terms of binary 1 and binary 0 levels insofar as the input signals are representative of logic function operations performed by preceding logic circuitry of the ECL type. The input signals are, essentially, compared to the reference signal $V_R$ which may be on the order of −1.2 volts. Operation of transistors Q1 and Q2 is a function of the comparison. If for example, a binary 1 signal is supplied to terminal 17 during the drive mode of operation, transistor Q1 is rendered conductive and transistor Q2 is rendered essentially nonconductive. This condition occurs inasmuch as the emitters of transistors Q1 and Q2 are connected to a common source while the base of transistor Q1 receives a more positive signal than is supplied to the base of transistor Q2. When transistor Q2 is nonconductive, the signal supplied to node 50 (i.e., the base of transistor Q7 and the base of transistor Q4) is essentially +V and transistor Q3 is reverse biased and nonconductive.

The +V signal at the base of transistor Q4 renders this transistor conductive. Consequently, a relatively positive signal is supplied to the base of transistor Q5 to render transistor Q5 conductive as well. The signal supplied through transistor Q5 is applied via resistor 12 to the $D_0$ input of memory 14. Thus, a positive $D_0$ signal (e.g., a binary 1) is supplied to memory 14 by the circuit when operating as a driver with a binary 1 input.

The signal voltage at the emitter of transistor Q5 is also applied to the emitter of transistor Q7 and, via resistor 12, to the collector of transistor Q6. However, this signal is negative relative to the +V signal supplied to the base of transistor Q7, thereby rendering Q7 nonconductive when the driver is charging the output load toward the high voltage state (+V). This condition occurs when a binary 1 logic input signal (−0.8 volt) is applied to $D_{0i}$ at input terminal 17. When transistor Q7 is nonconductive, transistor Q6 is also nonconductive since the base-emitter junction thereof is reverse biased.

Conversely, when the input signal at terminal 17 is a binary 0 during the drive mode of operation, the reference signal supplied to the base of transistor Q2 is more positive than the signal at the base of transistor Q1. Thus, transistor Q1 is nonconductive and transistor Q2 is conductive. In addition, transistor Q3 (in the diode connected configuration) is conductive when the signal at node 50 drops below ground (an the forward voltage drop across transistor Q3). When transistor Q2 is conductive, the potential at node 50 is, ideally, substantially ground potential. However, as noted, transistor Q3 effects a clamping function on node 50 and the potential may be about −0.8 volt. The signal at node 50 causes transistor Q4 and, thus, transistor Q5 to be nonconductive. However, transistor Q7 is rendered conductive and a current is supplied therethrough, via resistor 12, from the $D_0$ terminal of memory 14. In this condition, the driver circuit is operative to discharge the memory cell toward the low voltage state (i.e., approximately ground potential). If the memory cell was previously in the high voltage state, a relatively large signal may be developed through transistor Q7 and across resistor 11. When the signal is sufficiently large, transistor Q6 is also rendered conductive and operates to shunt a large portion of the current from memory 14 (at terminal $D_0$) to source $-V_1$. Thus, transistor Q6 operates to increase speed and power handling capabilities of the circuit during the drive mode of operation.

Thus, there has been described the circuit operation when a binary 1 or binary 0 input signal is supplied to terminal 17 during the drive mode operation. It should be noted that in order to write (i.e., drive) into the memory, the input signals $D_{0i}$ and $D_{1i}$ are opposite or complementary signals. For example, input signal $D_{0i}$ may be a binary 1 and input signal $D_{1i}$ may be a binary 0, or vice versa, as suggested supra. The specific signal levels are a function of the specific circuit application and configuration.

Conversely, when the circuit is in the read mode (i.e., sensing the memory) both the $D_{0i}$ and $D_{1i}$ signals (at terminals 17 and 17A) are the same level. In the embodiment described herein, the input signal level is a low or binary 0 level. In response to this input condition transistor Q7 or 7A is rendered conductive (see supra) whereby an output signal will be produced across resistor 11 or 11A. The condition and magnitude of the output signal depends upon the state of the memory cell being sensed (i.e., high or low voltage state). Also, the sense amplifier will be enabled at this time to operate upon the signal detected.

The signal current through transistor Q7 and resistor 11 is a function of the signal stored in memory 14. That is, the signal current for a binary 1 (in the memory) is on the order of 100 microamperes or more, while the signal current for a binary 0 (in the memory) is on the order of 20 microamperes or less. These signals, as noted, are routed through resistor 11 to source $-V_1$. Thus, transistor Q7 operates as a common base amplifier with resistor 11 as the load. The signal developed across resistor 11 (even at 100 microamperes) is insufficient to cause appreciable base current in transistor Q6. Thus, transistor Q6 remains essentially nonconductive while the signal developed across resistor 11 is applied to input terminal S of sense amplifier 15 in a normal sense operation. Correspondingly, the current through transistor Q7A and resistor 11A is of the order of 20 microamperes and 100 microamperes, respectively, for a binary 1 and binary 0 memory output condition.

In order to prevent amplifier 15 from being overdriven by an excessively large output signal, as for example a noise signal or the like during the sense mode operation, and, consequently, becoming slowed in operation, the signal across resistor 11 (or resistor 11A) is also supplied to the base of transistor Q6 (or Q6A). If the signal across resistor 11 is sufficiently large, transistor Q6, via the base-emitter junction thereof, becomes conductive, lowers the voltage at the emitter of transistor Q7, and shunts excess signal current to source $-V_1$, and effectively limits the signal across resistor 11. Thus, during the sense mode of operation, transistor Q6 operates as a voltage limiting transistor and limits the signal which is supplied to sense amplifier 15, while transistor Q7 operates as a low current driver. Without the circuit path including transistor Q6, transistor Q7 could not be a low current device. Moreover, the addition of transistor Q6 permits a power boost for the circuit since large power can be handled thereby. Since transistors Q4, Q5 and Q6 are of opposite conductivity type relative to transistor Q7, low standby power dissipation and buffering for the sense amplifier are ensured.

It will be readily apparent to those skilled in the art, that certain modifications can be made in this circuit. For example, signal levels can be changed, polarities reversed and the like. However, the modifications which fall within the purview of this invention are intended to be included therein. The specific values of voltages and the like which are noted are for purposes of illustration only and are not meant to be limitative of the invention which is defined in the appended claims.

What is claimed is:

1. A circuit for handling information signals in accordance with control signals comprising:
- signal supplying means for supplying and receiving signals and having a terminal serving as both an input terminal and an output terminal,
- output means having an input terminal,
- first source of potential,
- input means receptive of the control signals,
- first coupling means having a conduction path coupled between said first source of potential and the input/output terminal of said signal supplying means, and having a control electrode coupled to said input means for controlling the conduction of the conduction path, said first coupling means conducting a signal to said signal supplying means in the presence of a first control signal at the input means,
- a second coupling means having a conduction path coupled between the input/output terminal of said signal supplying means and the input terminal of said output means, and having a control electrode coupled to said input means for controlling the conduction of the conduction path, said second coupling means conducting a signal from said signal supplying means to said output means in the presence of a second control signal at the input means, and
- limiting means coupled to the second coupling means for limiting the amplitude of the signal supplied to said output means from said signal supplying means via said second coupling means and for diverting a portion of the signal from said signal supplying means in accordance with the magnitude of the signal conducted by the second coupling means.

2. The circuit recited in claim 1 wherein an impedance element is connected between the input terminal of said output means and a second source of potential and said second coupling means and said limiting means jointly include first and second transistors of opposite conductivity types having respectively first and second base, emitter, and collector electrodes, the first emitter coupled to the input/output terminal of said signal supplying means, the first collector coupled to the input terminal of said output means, the first base coupled to said input means, the second emitter coupled to said second source of potential, the second collector coupled to the input/output terminal of said signal supplying means, the second base coupled to the first collector.

3. The circuit recited in claim 2 wherein said first coupling means includes a pair of transistors of the same conductivity type as said second transistor connected in Darlington configuration.

4. The circuit recited in claim 1 wherein said input means includes level shifting means for making said circuit operation compatable with the control signal.

5. The circuit recited in claim 4 wherein said level shifting means includes a pair of semiconductor devices each having a control terminal and an output terminal and being connected in differential configuration,
- said control signals coupled to a control terminal of one of said pair of semiconductor devices,
- reference signal means connected to a control terminal of the other one of said pair of semiconductor devices, and
- an output terminal of one said pair of semiconductor devices coupled to the control electrodes of said first and second coupling means.

6. The circuit recited in claim 2 including unilateral conducting means connected between the output terminals of said pair of semiconductor devices to selectively control the signal at the control electrodes of said first and second coupling means.

7. The circuit recited in claim 1 wherein said signal supplying means includes memory means,
- said output means includes sense amplifier means for detecting signals from said memory means, and
- impedance means connected between said input terminal of said output means and a second source of potential such that said second coupling means supplies signals through said impedance means and said sense amplifier means detects a signal across said impedance means.

8. The circuit recited in claim 1 wherein said signal supplying means is a double-ended circuit having a pair of input/output terminals,
- said output means is a double-ended circuit having a pair of input terminals,
- a pair of said first and second coupling means are differentially arranged and individually interconnected with said signal supply means and said output means to effect common mode signal suppression at the double-ended input of said output means, and
- said input means are coupled to each combination of said first and second coupling means.

* * * * *